(12) United States Patent
Moyer

(10) Patent No.: US 9,086,977 B2
(45) Date of Patent: Jul. 21, 2015

(54) CACHE MEMORY WITH DYNAMIC LOCKSTEP SUPPORT

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 991 days.

(21) Appl. No.: 13/090,057

(22) Filed: Apr. 19, 2011

(65) Prior Publication Data

US 2012/0272007 A1 Oct. 25, 2012

(51) Int. Cl.
*G06F 12/08* (2006.01)
*G06F 11/16* (2006.01)
*G06F 12/12* (2006.01)

(52) U.S. Cl.
CPC ........ *G06F 12/0848* (2013.01); *G06F 11/1658* (2013.01); *G06F 12/126* (2013.01); *G06F 11/1629* (2013.01); *G06F 12/0815* (2013.01); *G06F 2201/845* (2013.01); *G06F 2212/1016* (2013.01)

(58) Field of Classification Search
CPC ... G06F 9/30189; G06F 9/3885; G06F 11/16; G06F 12/0848; G06F 12/0806; G06F 12/0864; G06F 2201/845
USPC .................................. 711/128, 129; 712/229
See application file for complete search history.

(56) References Cited

U.S. PATENT DOCUMENTS

| | | | |
|---|---|---|---|
| 4,484,267 A | 11/1984 | Fletcher | |
| 6,961,824 B2 | 11/2005 | Rowlands et al. | |
| 6,973,540 B2 | 12/2005 | Moyer et al. | |
| 7,133,971 B2 | 11/2006 | Matick et al. | |
| 7,185,148 B2 | 2/2007 | Moyer | |
| 7,191,292 B2 | 3/2007 | Chaudhry et al. | |
| 7,409,502 B2 | 8/2008 | Moyer et al. | |
| 7,415,630 B2 | 8/2008 | Hillman et al. | |
| 7,574,564 B2 * | 8/2009 | Moyer .......................... | 711/128 |
| 2003/0131197 A1 * | 7/2003 | Morrison ...................... | 711/130 |
| 2008/0126718 A1 * | 5/2008 | Kottke et al. .................. | 711/154 |
| 2009/0113137 A1 | 4/2009 | Grayson et al. | |
| 2009/0119540 A1 | 5/2009 | Weiberle et al. | |
| 2010/0146335 A1 * | 6/2010 | Moyer et al. .................... | 714/25 |
| 2010/0211819 A1 * | 8/2010 | Weiberle et al. ................. | 714/5 |

FOREIGN PATENT DOCUMENTS

DE  102004051964  4/2006
EP  1398701 A1  3/2004

OTHER PUBLICATIONS

EP Corresponding Application 12164037.9, Extended European Search Report dated Aug. 2, 2012.

* cited by examiner

*Primary Examiner* — Charles Rones
*Assistant Examiner* — Andrew Russell
(74) *Attorney, Agent, or Firm* — Haynes and Boone, LLP

(57) ABSTRACT

Cache storage may be partitioned in a manner that dedicates a first portion of the cache to lockstep mode execution, while providing a second (or remaining) portion for non-lockstep execution mode(s). For example, in embodiments that employ cache storage organized as a set associative cache, partition may be achieved by reserving a subset of the ways in the cache for use when operating in lockstep mode. Some or all of the remaining ways are available for use when operating in non-lockstep execution mode(s). In some embodiments, a subset of the cache sets, rather than cache ways, may be reserved in a like manner, though for concreteness, much of the description that follows emphasizes way-partitioned embodiments.

20 Claims, 10 Drawing Sheets

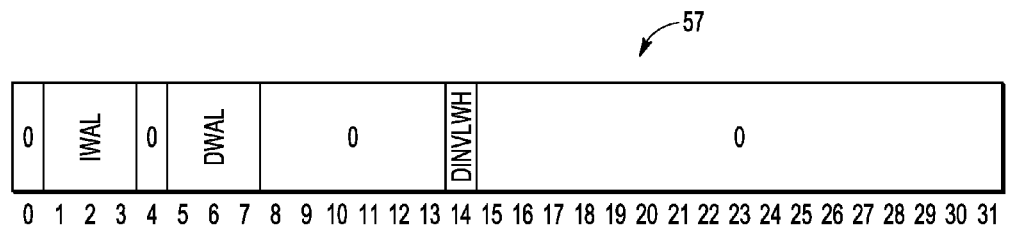

FIG. 4

| BITS | NAME | DESCRIPTION |
|---|---|---|
| 1:3 | IWAL | INSTRUCTION CACHE WAY ALLOCATION FOR LOCKSTEP MODE USE<br>000 - NO INSTRUCTION CACHE WAYS ARE ALLOCATED FOR LOCKSTEP MODE OPERATION<br>001 - ONE INSTRUCTION CACHE WAY (WAY 0) IS ALLOCATED FOR LOCKSTEP MODE OPERATION<br>010 - TWO INSTRUCTION CACHE WAYS (WAYS 0, 1) ARE ALLOCATED FOR LOCKSTEP MODE OPERATION<br>011 - THREE INSTRUCTION CACHE WAYS (WAYS 0, 1, 2) ARE ALLOCATED FOR LOCKSTEP MODE OPERATION<br>100 - FOUR INSTRUCTION CACHE WAYS (WAYS 0, 1, 2, 3) ARE ALLOCATED FOR LOCKSTEP MODE OPERATION<br>101 - FIVE INSTRUCTION CACHE WAYS (WAYS 0, 1, 2, 3, 4) ARE ALLOCATED FOR LOCKSTEP MODE OPERATION<br>110 - SIX INSTRUCTION CACHE WAYS (WAYS 0, 1, 2, 3, 4, 5) ARE ALLOCATED FOR LOCKSTEP MODE OPERATION<br>111 - RESERVED |

FIG. 5

| BITS | NAME | DESCRIPTION |
|---|---|---|
| 5:7 | DWAL | DATA CACHE WAY ALLOCATION FOR LOCKSTEP MODE USE<br>000 - NO DATA CACHE WAYS ARE ALLOCATED FOR LOCKSTEP MODE OPERATION<br>001 - ONE DATA CACHE WAY (WAY 0) IS ALLOCATED FOR LOCKSTEP MODE OPERATION<br>010 - TWO DATA CACHE WAYS (WAYS 0, 1) ARE ALLOCATED FOR LOCKSTEP MODE OPERATION<br>011 - THREE DATA CACHE WAYS (WAYS 0, 1, 2) ARE ALLOCATED FOR LOCKSTEP MODE OPERATION<br>100 - FOUR DATA CACHE WAYS (WAYS 0, 1, 2, 3) ARE ALLOCATED FOR LOCKSTEP MODE OPERATION<br>101 - FIVE DATA CACHE WAYS (WAYS 0, 1, 2, 3, 4) ARE ALLOCATED FOR LOCKSTEP MODE OPERATION<br>110 - SIX DATA CACHE WAYS (WAYS 0, 1, 2, 3, 4, 5) ARE ALLOCATED FOR LOCKSTEP MODE OPERATION<br>111 - RESERVED |
| 5:7 | DINVLWH | DATA CACHE INVALIDATE LOCKSTEP WAY ON WRITE-HIT IN PERFORMANCE MODE<br>0 - A WRITE HIT TO A LOCKSTEP WAY WHILE IN PERFORMANCE MODE UPDATES THE WAY, TO ENSURE A SUBSEQUENT PERFORMANCE MODE READ HIT RETURNS COHERENT DATA.<br>1 - A WRITE HIT TO A LOCKSTEP WAY WHILE IN PERFORMANCE MODE INVALIDATES THE WAY, TO ENSURE A SUBSEQUENT LOCKSTEP MODE READ HIT DOES NOT OCCUR. |

FIG. 6

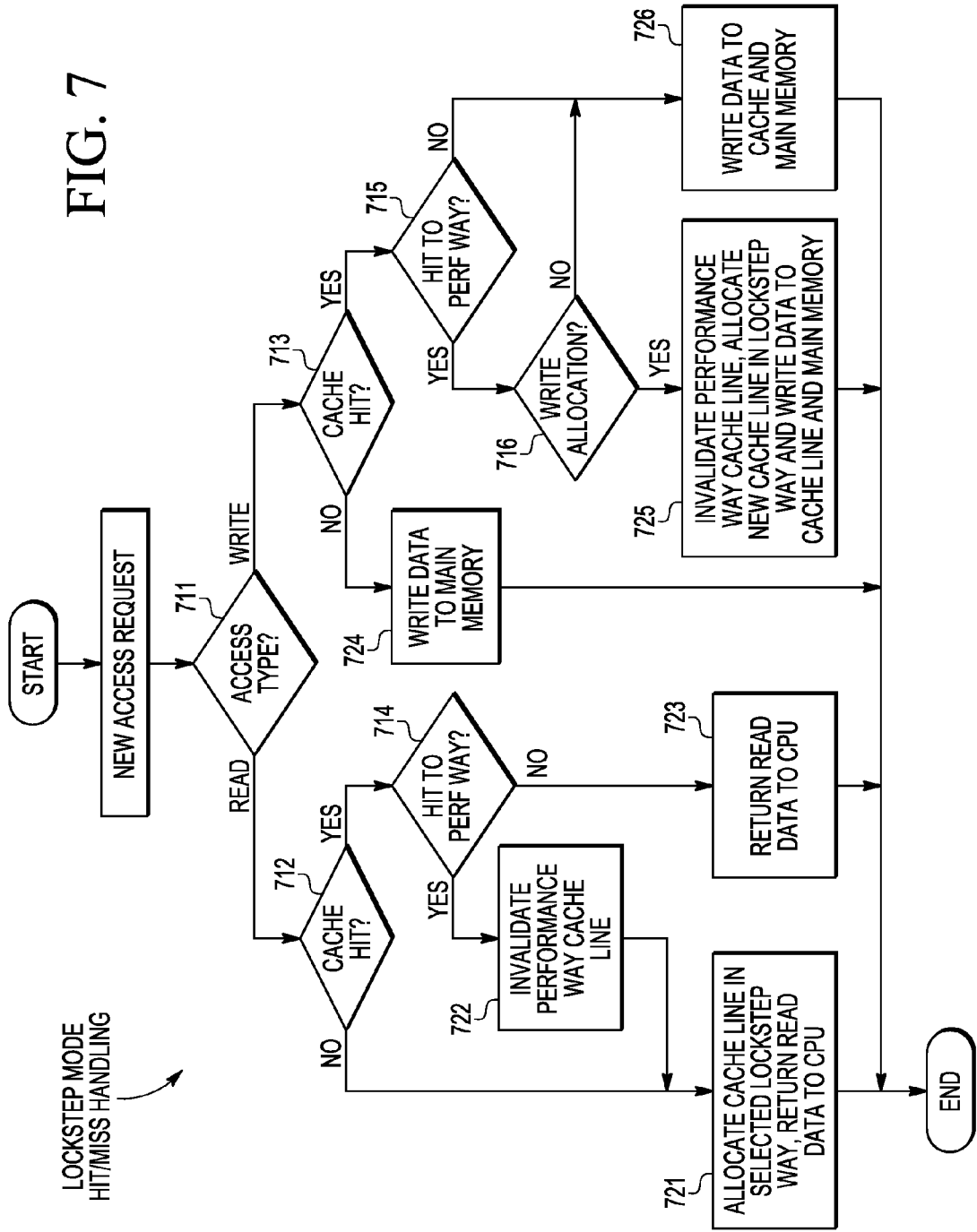

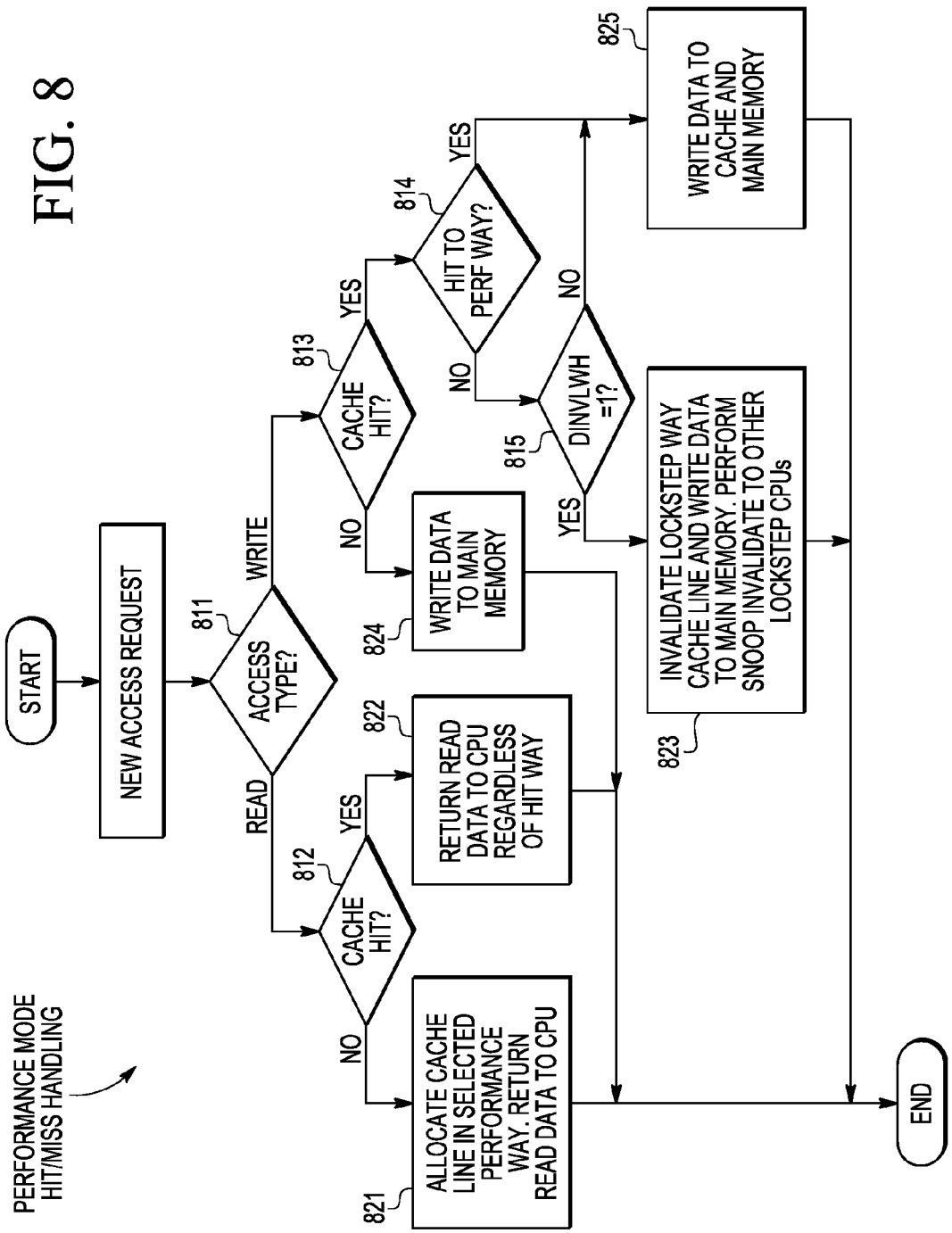

CACHE MEMORY WITH DYNAMIC LOCKSTEP SUPPORT

CROSS-REFERENCE TO RELATED APPLICATION(S)

The present application is related to commonly-owned, co-pending U.S. patent application Ser. No. 13/090,056, filed on even date herewith, entitled "DYNAMIC LOCKSTEP CACHE MEMORY REPLACEMENT LOGIC," and naming William C. Moyer as inventor, the entirety of which is incorporated herein by reference.

BACKGROUND

1. Field

The present invention relates to multiprocessor data processing systems and, more particularly, to cache techniques that facilitate transitioning between lockstep and non-lockstep modes of processor operation.

2. Related Art

In some data processing applications, multiple processor instances are employed to concurrently execute identical code sequences with identical data inputs. Typically, the processors execute in lockstep. Error logic may then detect a difference in execution states of the processors and, based thereon, signal a transient or permanent error in one of the processor instances. For example, in automotive electronics systems, this form of redundancy can be used to achieve reliability thresholds or desired safety integrity levels. Unfortunately, providing redundant processors can be expensive and, as a general proposition, not all aspects of a data processing application require such reliability or safety integrity levels. As a result, non-critical aspects of a data processing application may be burdened by lockstep execution overheads and/or otherwise useful processing cycles may be squandered.

BRIEF DESCRIPTION OF THE DRAWINGS

The present invention is illustrated by way of example and not limited by the accompanying figures, in which like references indicate similar elements, and in which:

FIG. 4 illustrates, in diagrammatic form, portions of a cache control and status register that, in one example of the cache instance of FIG. 3, programmably define allocation of ways to lockstep and performance modes.

FIGS. 5 and 6, in turn, illustrate in tabular form, one example of field definitions within the cache control and status register of FIG. 4.

FIG. 7 illustrates, in flow diagram form, lockstep mode hit/miss handling of an access request in one example of the cache instance of FIG. 3.

FIG. 8 illustrates, in flow diagram form, performance mode hit/miss handling of an access request in one example of the cache instance of FIG. 3.

Figure 1:
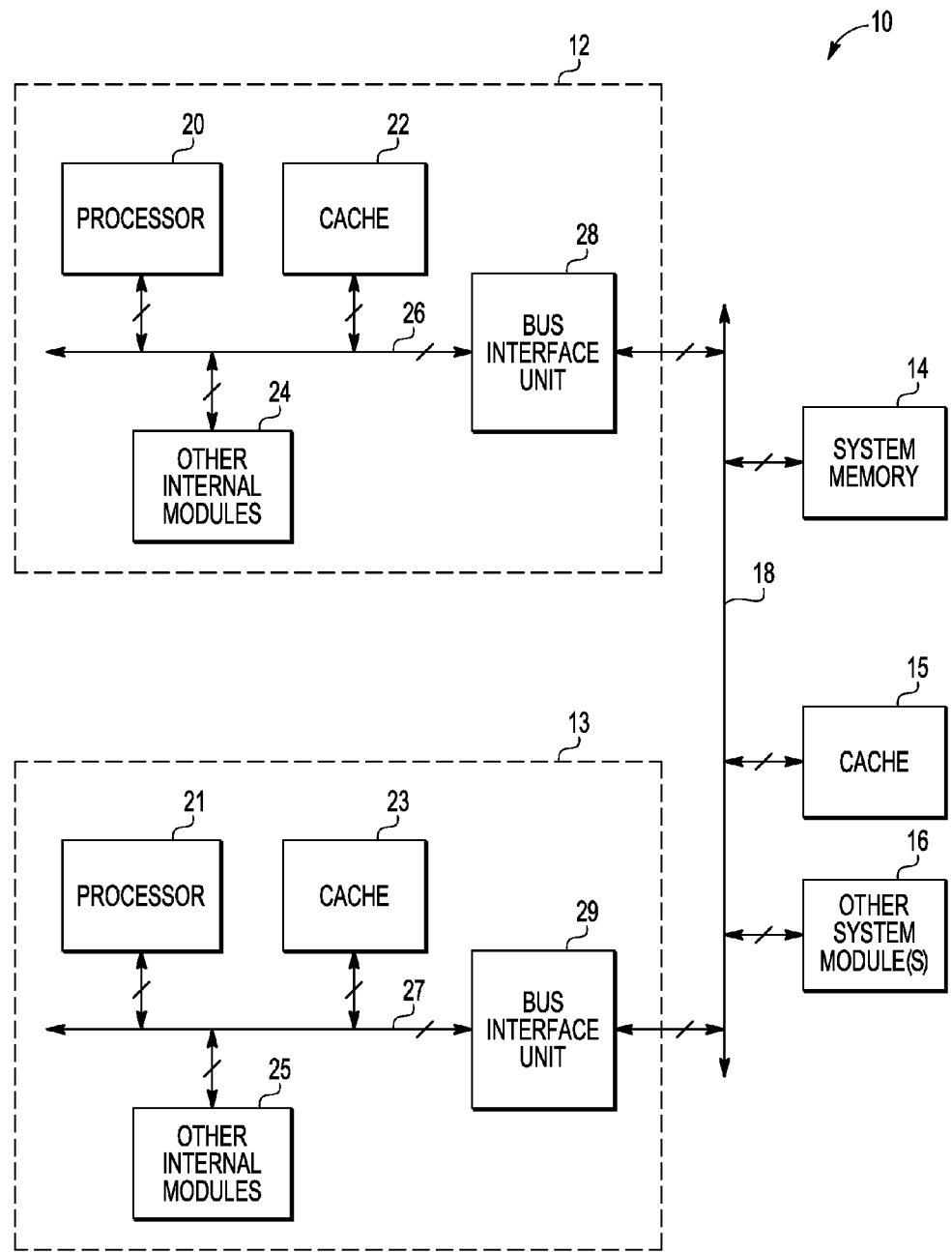
FIG. 1 illustrates, in block diagrammatic form, a data processing system in accordance with some embodiments of the present invention.

Persons of ordinary skill in the art will appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Techniques are desired whereby a collection of processor instances in a data processing system may, at times operate in a lockstep execution mode, while at other times (and/or for certain portions of the computational load) support concurrent, non-lockstep, execution of generally independent computational tasks. In this way, a data processing application may benefit from the additional processing power available in modern multiprocessor and multi-core processor implementations, while allocating a portion of that processing power to redundancy, when and if needed.

Dynamic entry into, and exit from, lockstep modes of execution, while desirable, can present significant challenges, particularly when caches are present in the data processing system. In particular, since lockstep operation typically requires identical execution of multiple processors on a cycle-by-cycle basis (or at least with phased, cycle-to-cycle correspondence) differences in caching states are problematic. For example, a difference in contents of respective caches employed by respective processors can result in one processor having a cache hit for a particular memory access in a code sequence, while another (or others) attempting to execute in lockstep take(s) a cache miss for the very same memory access. Maintaining identical caching states is complicated by interleaved execution of differing non-lockstep computations on the respective processors and the fact that replacement algorithms operant at respective caches may evict different cache lines.

Conventional solutions tend to be crude, either disabling the cache for lockstep execution, or invalidating or simply flushing cache contents at a transition between execution modes. As will be appreciated, synchronization of caching states for two processors entering lockstep execution can impose very high overhead, potentially adding thousands of execution cycles. What is needed are techniques that facilitate dynamic, low-overhead entry into (and in some cases exit from) processor lockstep execution mode from/to independent, non-lockstep execution mode(s).

Lockstep Partition and Hit/Miss Handling

It has been discovered that cache storage may be partitioned in a manner that dedicates a first portion of the cache to lockstep mode execution, while providing a second (or remaining) portion for non-lockstep execution mode(s). For example, in embodiments that employ cache storage organized as a set associative cache, partition may be achieved by reserving a subset of the ways in the cache for use when operating in lockstep mode. Some or all of the remaining ways are available for use when operating in non-lockstep execution mode(s). In some embodiments, a subset of the cache sets, rather than cache ways, may be reserved in a like manner, though for concreteness, much of the description that follows emphasizes way-partitioned embodiments.

In many practical data processing applications, lockstep mode execution exploits multiple processor instances for redundancy to achieve reliability or desired safety integrity levels, while non-lockstep execution provides increased execution performance by making processor instances available for execution of independent programs, processes or threads. Accordingly, though without limitation, much of the description herein focuses on exemplary embodiments and/or use scenarios in which transitions are between a safety-or redundancy-motivated lockstep execution mode and a non-lockstep, performance mode. Nonetheless, based on the description herein, persons of ordinary skill in the art will appreciate exploitations or adaptations of the inventive techniques in caching architectures that provide lockstep and non-lockstep modes without regard to safety or performance concerns.

Thus, focusing illustratively on way-partitioned embodiments, a first subset of the cache ways used in lockstep mode remain valid and are not flushed or invalidated when transitioning to performance mode, and vice-versa. Instead, these lockstep ways are locked or frozen and are not available for replacement while the processor with which they are associated executes in performance mode. In lockstep mode, these same lockstep ways are unlocked or unfrozen but, in accordance with the identical code sequences that execute on the processors of a lockstep execution set, identically track state of the lockstep ways in caches associated with the(se) other processor(s) of the lockstep execution set. Locking/unlocking is typically transparent to application software and may coincide with context switches between a process or thread which requires (or benefits from) lockstep mode execution on multiple processor instances and those that do not. Cache ways allocated to performance mode remain valid while in lockstep mode, but do not satisfy load or store hits, and are not available for allocation.

One implication of the above is that memory access requests made in one mode (e.g., in correspondence with load and store operations executed by the processors performance mode) may hit in a cache portion associated with the other mode. The cache operates in a writethrough mode and access requests are handled in a manner that maintains coherency between entries represented in respective portions of the cache, e.g., between corresponding cache line entries in lockstep and performance ways.

More specifically, cache hits to lockstep ways that result from load operations executed in performance mode are satisfied normally and return cache data to the processor. On the other hand, cache hits to performance ways that result from load operations executed in lockstep mode are not allowed to satisfy the load operation, since the performance ways in cache associated with the other processor (or processors) of the lockstep execution set may not contain the line. Instead, in one embodiment, such a hit causes the corresponding line in the performance way to be invalidated. As a result, there is no problem with multiple copies of the same address in multiple ways. Rather, hits to performance ways that result from load operations executed in lockstep mode are treated by hit/miss logic as a miss (relative to the lockstep ways) and result in a cache line allocation and fill to a cache line in a lockstep way.

Although write hits present challenges, the techniques described herein address these challenges in innovative manners. Write hits that occur (during performance mode execution) to cache ways that have been reserved for lockstep mode execution have two different behaviors, which can be programmatically selected by the user. A first selectable behavior is to update the cache contents (i.e., the contents of the lockstep mode way) normally, as if no special operation is assumed, relying instead on software techniques to invalidate prior to any lockstep mode access. The second selectable behavior is to invalidate the cache line on a write hit. These options are software selectable, e.g., by control register settings.

In many of the data processing applications for which dynamic transitions between lockstep and non-lockstep modes of execution would be desirable, no write hits are expected, as data shared between a performance mode portion of a data processing application and a lockstep portion is either minimal or non-existent. Even if data is shared between execution modes, it can typically be marked cacheinhibited, thereby obviating coherence issues. Alternatively, such data can be invalidated in the lockstep portion of the cache prior to access by the lockstep portion of the data processing application. Programming constructs and facilities for such invalidation are already common in systems that employing software-managed cache coherency, thus persons of ordinary skill in the art will appreciate exploitations of such facilities to effectuate the desired invalidation of a lockstep way entry if the selected behavior allows the write hit to complete "normally" to either lockstep ways or performance ways, regardless of execution mode.

Optionally, performance mode write hits to ways allocated to lockstep mode can be configured to cause invalidation of the corresponding cache line in the same processor. In systems that provide hardware coherency support, this option is attractive since the write data will also be written through into system memory, and the write through operation will generate a snoop cycle to the other processor(s) which is (are) temporarily running independently. This snoop cycle will then invalidate the corresponding cache line in the other processor(s). As will be appreciated, the final state will be such that the line has been removed from the lockstep ways of each processor, and thus cache state remains consistent, assuring that future lockstep operation will not be affected by inconsistent cache contents.

When executing in lockstep mode, write hits to ways allocated to performance mode will update the performance mode cache line if no write allocation is performed, and the write will be treated as a forced-writethrough. If write allocation is performed, then a write hit to a performance mode cache line will first cause an invalidation of that line. Following the invalidation, the line will be allocated in a lockstep mode way. Snoop operations proceed normally in both modes, and do not distinguish between performance mode and lockstep mode states or cache way allocations. Cache coherency is thus maintained, regardless of which ways (if any) of the cache(s) of the other processor(s) contain the same cache line.

Replication of Replacement Pointer/States

It has further been discovered that to facilitate dynamic lockstep support, replacement states and/or logic used to select particular cache lines for replacement with new allocations in accord with replacement algorithms or strategies may be enhanced to provide generally independent replacement contexts for use in respective lockstep and performance modes. In some cases, replacement logic that may be otherwise conventional in its selection of cache lines for new allocations in accord with a first-in, first-out (FIFO), round-robin, random, least recently used (LRU), pseudo LRU, or other replacement algorithm/strategy is at least partially replicated to provide lockstep and performance instances that respectively cover lockstep and performance partitions of a cache. In some cases, a unified instance of replacement logic may be reinitialized with appropriate states at (or coincident with) transitions between performance and lockstep modes of operation.

In either case, implementations of counters, pointers or other replacement logic or circuits state suitable for maintaining and advancing a replacement state in correspondence with cache hit/miss sequences are well understood in the art. Based on the description herein, persons of ordinary skill in the art will appreciate suitable extensions to replicate such replacement logic/circuits and/or the initialization of same in correspondence with transitions between performance and lockstep modes of operation.

Persons of ordinary skill in the art will likewise appreciate that a cache may implement replacement strategies that have both global and local aspects. For example, in a system that implements "way locking" to lock certain cache ways from being replaced, global replacement logic may identify a cache way to be replaced that excludes the locked cache way(s) and override any operant local replacement logic if the local replacement logic pointed to a locked cache way. In some embodiments, an operant instance of local replacement logic selects (subject to global replacement logic preemption or override) from amongst ways of an applicable lockstep or performance partition. In some embodiments, preemption or override by global replacement logic may allow the cache controls to efficiently avoid interrogating or modifying numerous local replacement state values for a global policy change like locking a particular cache way.

While embodiments are described that implement both local and global replacement aspects consistent with a way-partitioned set associative cache example in which way locking is supported, it will be understood that some embodiments in accordance with the present invention need not implement a global replacement state override. Likewise, in some cache designs (such as in embodiments where partitioning is by cache sets rather than by cache ways) replacement logic may not have local scope per se. Accordingly, claim terminology that does not specify a local or global scope for replacement logic is intended to broadly encompass logic that may have local scope, global scope or both local and global scope.

In short, whether by replication or initialization, cache control logic described herein duplicates the state of replacement logic for independent use in lockstep and performance modes. The state of replacement logic used in lockstep mode is generally frozen during performance mode operation or, in some cases, reinitialized on transition to lockstep mode. In cache control logic implementations that distinguish between local and global replacement states, performance mode load or store hits to entries in a lockstep partition do not affect lockstep mode replacement state (e.g., pseudo-LRU state in a lockstep mode instance of local replacement logic) for those entries or any global replacement state used in lockstep mode, even though the load or store access may be satisfied by the lockstep partition hit. Hits to performance ways are not allowed to satisfy access requests while in lockstep mode. Accordingly, replacement state updates can optionally be performed for performance mode replacement state (e.g., pseudo-LRU state in a performance mode instance of local replacement logic) if, during lockstep mode operation, a cache line is invalidated in the performance partition.

Embodiments in accord with the foregoing will be understood relative to the description of example implementations and operations that follow.

Systems and Integrated Circuit Realizations, Generally

Referring to FIG. 1, in one embodiment, a data processing system 10 includes a pair of integrated circuits 12, 13, a system memory 14 and one or more other system module(s) 16. The integrated circuits 12, 13, system memory 14 and the one or more other system module(s) 16 are illustratively connected via a multiple conductor system bus 18 although any of a variety of communication paths may be provided. Integrated circuit 12 includes at least one processor 20, core or other form of programmable execution unit that is connected to an associated local cache 22 via a multiple conductor internal bus 26. In some embodiments, local cache 22 is organized as a set associative cache. Also connected to the internal bus 26 are other internal modules 24 and a bus interface unit 28. The bus interface unit 28 has a first multiple conductor input/output terminal connected to the internal bus 26 and a second multiple conductor input/output terminal connected to the system bus 18.

Integrated circuit 13 is substantially similar in design to integrated circuit 12 and likewise includes at least one processor 21 connected to an associated local cache 23 via a multiple conductor internal bus 27. Also connected to internal bus 27 are other internal modules 25 and a bus interface unit 29 that connects to system bus 18.

Figure 2:
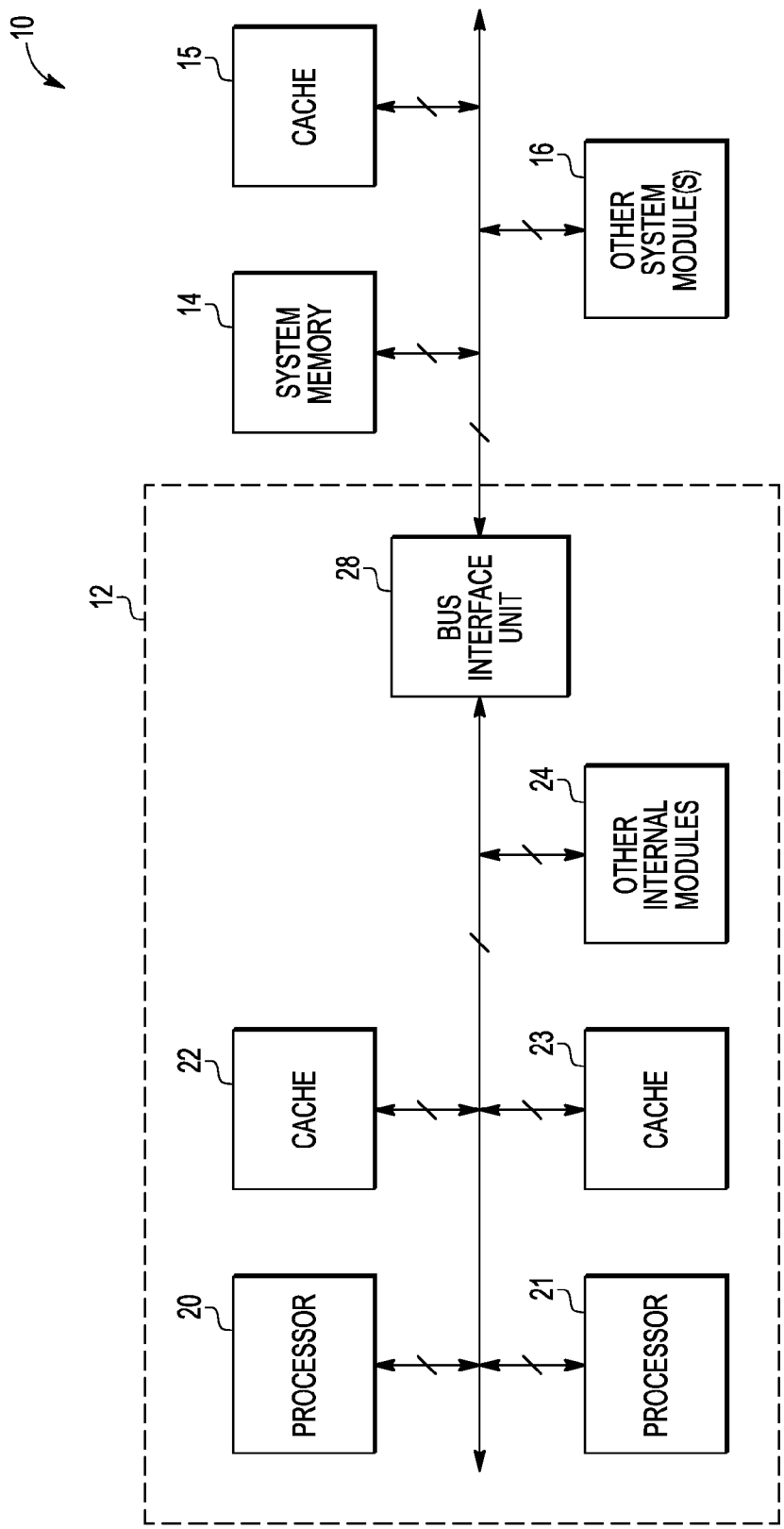
FIG. 2 illustrates, in block diagrammatic form, another data processing system in accordance with some embodiments of the present invention.

It should be understood that data processing system 10 is exemplary and is presented in a way that tends to facilitate description of various inventive techniques herein relative to an illustrative pair of processors and associated local caches. Neither the multiplicity of integrated circuits, nor separation of processors 20, 21 (and associated local caches 22, 23) on distinct internal busses 26, 27 are at all essential. Indeed, FIG. 2 illustrates a variation in which processors 20, 21 (and associated local caches 22, 23) are interconnected using internal bus 26, all formed on a single integrated circuit. More generally, larger numbers of processors and associated caches may be provided. Processors may be implemented as one or more cores in a multi-core design. Caches may be more tightly integrated with portions of an integrated circuit that implement the processors, cores or execution units (generally "processors") illustrated and described herein, and other interconnect technologies (including crossbar networks, point-to-point communications, etc.) may be substituted for bus-type interconnects illustrated.

In view of the above, and without limitation, certain operational aspects are now more completely described with reference to illustrative FIGS. 1 and 2. In operation, processors of integrated circuits 12 and/or 13 perform programmed data processing functions wherein respective processors 20, 21 execute instructions and utilize the other illustrated elements in the performance of the instructions. In accord with description elsewhere herein, processors 20, 21 of data processing system 10 may, at times operate in a lockstep execution mode, while at other times (and/or for certain portions of the computational load) support concurrent, non-lockstep, execution of generally independent computational tasks. For convenience of description and terminology, processors 20, 21 and their associated local caches 22, 23 are said to transition dynamically between lockstep and performance modes.

To provide the appearance of extremely fast addressable memory, caching techniques are employed, including in the illustrated configuration, use of local caches 22, 23 to each respectively maintain a subset of data and/or instructions in accessed in the course of the aforementioned programmed data processing functions. If data and/or instructions being read or written by processor 20, 21 are not available in a valid entry of an associated local cache, they may be retrieved from storage at a higher level of cache (e.g., cache 15) or system memory 14. To facilitate the dynamic transitioning between lockstep and performance modes, local caches 22, 23 are partitioned in a manner that dedicates a first portion of the cache to lockstep mode execution, while providing a second (or remaining) portion for non-lockstep execution mode(s). For example, local cache 22 may be organized as a set associative cache, and partitioning may be achieved by reserving a subset of the ways in local cache 22 for use when processor 20 operates in lockstep mode. Likewise with respect to local cache 23 and processor 21. Some or all of the remaining ways are available for use when operating in non-lockstep execution mode(s). As previously explained, way-partition is illustrative and, in some embodiments, a subset of the cache sets, rather than cache ways, may be reserved in a like manner, though for concreteness, much of the description that follows emphasizes way-partitioned embodiments.

Cache Storage And Implementation Example

Figure 3:
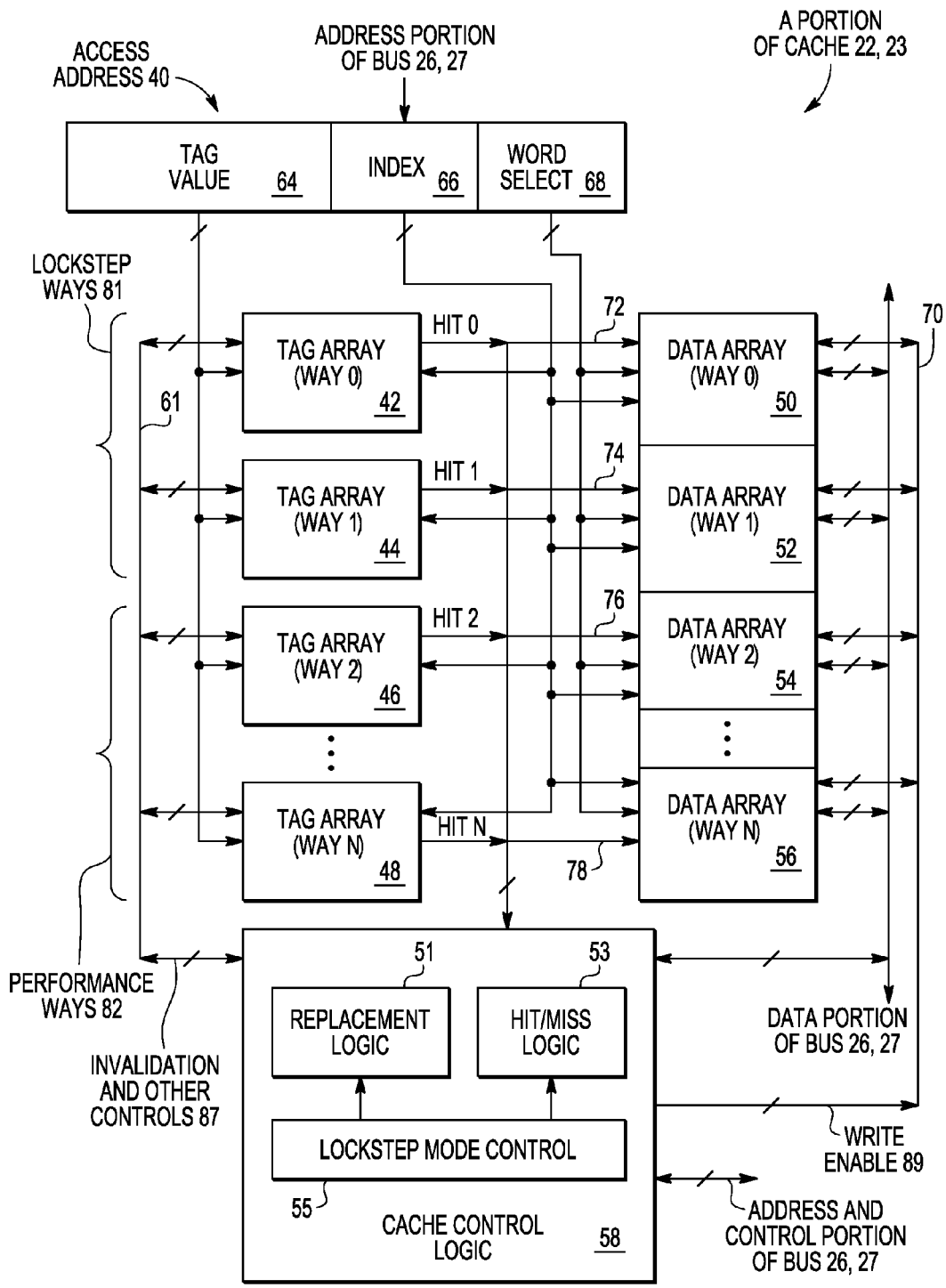
FIG. 3 illustrates, in block diagrammatic form, one example of a cache instance such as illustrated in FIG. 1 or FIG. 2, the cache instance including cache control logic adapted for dynamic lockstep support.

FIG. 3 depicts portions of one example of an N-way, set-associative cache instance such as illustrated in FIGS. 1 and 2 as cache 22 and/or cache 23. The illustrated cache instance includes cache control logic adapted for dynamic lockstep support in accordance with some embodiments of the present invention. Cache 22, 23 includes a tag memory array for multiple ways 42, 44, 46 . . . 48, data memory array for multiple ways 50, 52, 54 . . . 56, and cache control logic 58. In the illustrated portion of cache 22, 23, lockstep mode control 55 (which may be implemented as one or more control registers of, or accessible to, cache control logic 58) codes or otherwise identifies a current operating mode (e.g., lockstep or performance) together with a current way-denominated partition of the associated cache instance into lockstep ways 81 and performance ways 82.

An access address 40 is received from an address portion of bus 26 or 27 and has a tag value portion 64, an index portion 66, and a word select portion 68. For example, for a read access, access address 40 corresponds to the address of the requested information (e.g., data or instructions). In the illustrated embodiment, access address 40, when received, is stored within register 62. Tag portion 64 of access address 40 includes tag value data that is provided to the multi-way tag array 42, 44, 46 . . . 48. Data from the index portion 66 is provided to both the multi-way tag array 42, 44, 46 . . . 48 and to the multi-way data array 50, 52, 54 . . . 56 and is used to provide an index into the tag and data arrays. For example, in one embodiment, index portion 66 includes a set indicator to select one of a predetermined number of sets within the tag and data portions of each way. Data from the word select portion 68 is provided to the multi-way data array 50, 52, 54 . . . 56 such that data within a data array, such as data array (way 0) 50, is indicated by both index portion 66 and word select portion 68. That is, index portion 66 may identify one entry of data array (way 0) 50, and word select 68 then identifies a portion of that entry. The multi-way data array is also coupled to a bidirectional data portion of the bus 26, 27 to receive and provide data.

Each portion of the tag array, such as tag array (way 0) 42 provides a hit signal (which is gated, validated or otherwise influenced by hit/miss logic 53 of cache control logic 58) indicating that a hit has occurred to a particular way of the cache, which is then used to select a corresponding data array, such as data array (way 0) 50, based on a comparison between tag value 64 and data within the respective portion of multi-way tag array 42, 44, 46 . . . 48 located with respect to index value 66. For example, in operation, tag portion 64 is compared with a value retrieved from the tag array (way 0) 42 via index portion 66 to provide hit signal 72 in accord with gating, validation or influence by hit/miss logic 53 consistent with dynamic lockstep hit/miss handling described herein.

In general (and again subject to gating, validation or influence by hit/miss logic 53), if the compared values result in a match, then hit signal 72 is asserted to indicate a hit. Data array (way 0) 50 includes a plurality of data blocks and is addressed by both the index value 66 and the word select value 68, and, in response to the hit, the addressed data item is output from the data array (way 0) 50 to the data portion of bus 26, 27. If, however, the compared values do not result in a match, then hit signal 72 is not asserted, indicating a miss in that way of cache 22, 23. If there is no match between tag value 64 and any of the tags in multi-way tag array 42, 44, 46 . . . 48, then none of hit signals 72, 74, 76 . . . 78 are asserted, indicating that access address 40 resulted in a miss in cache 22, 23.

Cache control circuitry 58, whose operation will be described in more detail below, is typically coupled to address, control and data portions of bus 26, 27 and operates, in view of settings, status or configuration data represented as lockstep mode control 55, to cause hit/miss logic 53 to gate, validate or otherwise influence the supply of hit/miss indications (e.g., hit signals 72, 74, 76 . . . 78) and to control operation of replacement logic 51 in accord with behaviors desired for a current lockstep or performance operating mode. For example, depending on particular settings, status or configuration data represented as lockstep mode control 55, different cache replacement states and/or mechanisms may be operant and different hit/miss handling may be selected. Although such replacement states/mechanisms and hit/miss handling ultimately affect invalidation and other controls 87 signals, write enable 89 signals, and hit signals 72, 74, 76 . . . 78 supplied to the data and tag arrays of cache 22, 23, the utilization and/or effect of such signals is largely conventional and will be understood by persons of ordinary skill in the art.

Note that FIG. 3 illustrates only one example of a portion of cache 22, 23. In alternate embodiments, other registers, data and control path, and/or tag and data array configurations may be provided in any of a variety of conventional or unconventional manners to achieve basic caching functionality. Building on the description herein, cache control logic (such as illustrated in FIG. 3) may be adapted, in accordance with particular cache lookup, replacement and/or partition facilities provided in such alternative embodiments to allocate respective partitions to lockstep and performance modes, to specialize hit/miss handling in accord with operating mode and the partition in which hits may occur and to maintain replacement state for lockstep and performance modes respectively. Accordingly, while FIG. 3 depicts portions of one example of a cache instance that, for purposes of dynamic lockstep support is way-partitioned in a N-way, set-associative manner, based on the present description, persons of ordinary skill in the art appreciate suitable adaptations for other cache organizations or partitions in which dynamic lockstep support may be provided. In view of the foregoing, and without limitation, examples of cache control logic and operations are now detailed.

FIGS. 4, 5 and 6 illustrate fields of a lockstep partition register 57 that, in one example of lockstep mode control 55, programmably defines both (i) an allocation of cache ways to lockstep and performance modes of operation and (ii) invalidation behaviors in cache 22, 23. For example, in the context of FIG. 3, lockstep partition register 57 defines the partition of available cache ways into lockstep ways 81 and performance ways 82. Note that for simplicity of description and illustration, cache instances are explained in a context generally consistent with for use as an L1 data cache; however, more generally, the techniques described herein are applicable to both data cache and instruction cache instances or portions of a different overall caching scheme. Based on the data-cache-centric description herein, persons of ordinary skill in the art will appreciate application of the described techniques and structures to instruction cache instances and/or to portions of an address space in which instructions reside. Accordingly, in the example of FIGS. 4, 5 and 6, way partition of an instruction cache portion and a data cache portion of a caching facility are separately programmable (e.g., using field IWAL for instruction cache way allocation and field DWAL for data cache way allocation). Field DINVLWH programmably defines data cache behavior for a write hit in a lockstep way that occurs during performance mode operation.

Referring again to FIG. 3, in response to an access request from a requesting device, the address of the requested information is provided to cache 22, 23 as access address 40. If tag value 64 of access address 40 results in a match within the tag arrays 42, 44, 46, and 48, then a cache hit occurs; otherwise a cache miss occurs. Handling of such a cache hit or miss depends generally on (i) the operating mode (e.g., lockstep or performance) in which the hitting or missing access occurs, (ii) the type of access request (e.g., a read request or a write request), (iii) whether a hit, if applicable, is in a cache partition (e.g., in a cache way) allocated to performance mode, and in some implementations (iv) programmable invalidation behavior. More specifically, operation of hit/miss logic 53 will be understood with respect to the lockstep mode hit/missing handling flow diagram of FIG. 7 and with respect to the performance mode hit/miss handling flow diagram of FIG. 8.

Replacement states (represented generally by replacement logic 51) are updated in correspondence with hit/miss handling; however, the operant version of replacement state (e.g., for miss-triggered allocation of a cache line) and the particular updates performed depend upon (i) the operating mode (e.g., lockstep or performance) in which the access occurs and, in the case of a hit, (ii) whether the hit is in a cache partition (e.g., in a cache way) allocated to performance mode. More specifically, operation of replacement logic 51 will be understood with respect to the lockstep mode, replacement state flow diagram of FIG. 11 and with respect to the performance mode, replacement state flow diagram of FIG. 12. Generally, any of a variety of replacement algorithms or strategies may be implemented including first-in, first-out (FIFO), round-robin, random, least recently used (LRU), pseudo LRU, etc. In some implementations, replacement state and/or logic is simply replicated for lockstep or performance modes. In some implementations, logic and state that support replacement behaviors need not be fully replicated but rather may be initialized in correspondence with transitions between lockstep and performance modes.

Hit/Miss Handling

FIG. 7 illustrates lockstep mode hit/miss handling of access requests in one example of the cache instance of FIG. 3. In contrast, FIG. 8 illustrates performance mode hit/miss handling of access requests. Thus, depending on the current mode in which a processor (e.g., processor 20, 21, recall FIGS. 1 and 2) operates, the handling (by hit/miss logic 53, recall FIG. 3) of a given read or write access request that hits or misses in the associated cache (e.g., cache 22, 23) can be understood with reference to FIG. 7 or FIG. 8.

Turning first to FIG. 7, lockstep mode hit/miss handling provided by hit/miss logic 53 of a cache (e.g., cache 22, 23) may be provided using any suitable logic or circuit in which appropriate data transfer, allocation and/or invalidation actions (see actions 721, 722, 723, 724 and 725) are selected based on type of access request (see decision 711), hit or miss (see decisions 712, 713) in the tag arrays 41, 44, 46 . . . 48 (recall FIG. 3), and in the case of hits, the partition (e.g., performance ways 82 or lockstep ways 81, per decision 714, 715) in which the requested access hits. More specifically, in the case of a lockstep mode read (or load) access, a hit in a cache line of a performance way (see decisions 712, 714 [yes, yes]) triggers invalidation of the performance way cache line (722) after which a cache line is allocated (and filled) in a lockstep way (721) and thereafter or coincident with the allocation/fill of the new cache line in the lockstep way, read data is returned to the requesting processor. If the lockstep mode read (or load) access hits a cache line of a lockstep way (see decisions 712, 714 [yes, no]), the request is satisfied with read data returned to the requesting processor from the lockstep way. A lockstep mode read (or load) access that misses (see decision 712 [no]) triggers allocation and fill in a lockstep way (721) and thereafter, following or coincident with allocation and fill, read data is returned to the requesting processor.

Turning to the case of a lockstep mode write (or store) access, and assuming an operant write-allocate cache policy (see decision 716 [yes]), a hit in a cache line of a performance way (see decisions 713, 715 [yes, yes]) triggers invalidation of the performance way cache line (722) after which a cache line is allocated in lockstep way (725) and thereafter write data is stored in both the newly allocated cache line of the lockstep way and main memory (e.g., memory 14, recall FIGS. 1 and 2). If a write-through or write-back cache policy is operant, the lockstep mode write (or store) access hit in a performance way (see decisions 713, 715, 716 [yes, yes, no]), cache control logic may forgo invalidation of the performance way cache line and allocation of a new line in a lockstep way and, instead, simply store the write data to both the performance way cache line that hit and main memory (see action 726). Likewise, if the lockstep mode write (or store) access hits in a lockstep way (see decisions 713, 715 [yes, no]), cache control logic causes write data to be stored in both the lockstep way cache line that hit and main memory (see action 726). A lockstep mode write (or store) access that misses (see decision 713 [no]) simply stores write data to main memory (see action 724).

Turning next to FIG. 8, performance mode hit/miss handling provided by hit/miss logic 53 of a cache (e.g., cache 22, 23) may be provided using any suitable logic or circuit in which appropriate data transfer, allocation and/or invalidation actions (see actions 821, 822, 823, 824 and 825) are selected based on type of access request (see decision 811), hit or miss (see decisions 812, 813) in the tag arrays 41, 44, 46 . . . 48 (recall FIG. 3), and in the case of write hits, the partition (e.g., performance ways 82 or lockstep ways 81) in which a requested write access hits (see decision 814). In practice, logic or circuit implementations of hit/miss logic 53 will typically encompass decision trees of both FIGS. 7 and 8 although, for ease of illustration, hit/missing handling is separately explained herein for lockstep and performance modes.

Referring then to FIG. 8, in the case of a performance mode read (or load) access, a hit (see decision 812 [yes]) returns read data (822) to the requesting processor regardless of the partition (e.g., performance ways 82 or lockstep ways 81) in which the read hits. A performance mode read (or load) access that misses (see decision 812 [no]) triggers allocation and fill in a performance way (821) and thereafter, following or coincident with allocation and fill, read data is returned to the requesting processor.

Turning to the case of a performance mode write (or store) access, programmable invalidation behavior may be supported in a way that accommodates coherence mechanisms (e.g., software or hardware based mechanism) that may be provided or operant in a given implementation. For example, in accord with the example lockstep partition register 57 described above (e.g., field DINVLWH, recall FIG. 6) and assuming a "data cache invalidate lockstep way on write-hit in performance mode" (DINVLWH=1) setting, a write hit in a cache line of a lockstep way (see decisions 813, 814, 815 [yes, no, yes]) triggers invalidation of the lockstep way cache line (823) and write data is stored in main memory (e.g., memory 14, recall FIGS. 1 and 2). Snoop cycles generated in a hardware coherence scheme can be relied upon to remove corresponding cache lines from lockstep ways of other cache instances. Alternatively, for a performance mode write (or store) access hit in a lockstep way (see decisions 813, 814, 815 [yes, no, no]), cache control logic may forgo invalidation of the lockstep way cache line and, instead, simply store the write data to both the lockstep way cache line that hit and main memory (see action 825). In this way, and given a software coherence mode oriented selection (e.g., DINVLWH=0, recall FIG. 6), invalidation of the now updated lockstep mode way may deferred pending transition to lockstep operating mode. Likewise, if the performance mode write (or store) access hit in a performance way (see decisions 813, 814 [yes, yes]), cache control logic causes write data to be stored in both the performance way cache line that hit and main memory (see action 825). Software managed cache coherence techniques are well understood in the art and, based on the description herein, persons of ordinary skill in the art will appreciate that performance mode write hits may, in this way, be allowed to completed "normally," that is without regard to the partition in which they hit. A performance mode write (or store) access that misses (see decision 813 [no]) simply stores write data to main memory (see action 824).

Replacement States

Figure 9:
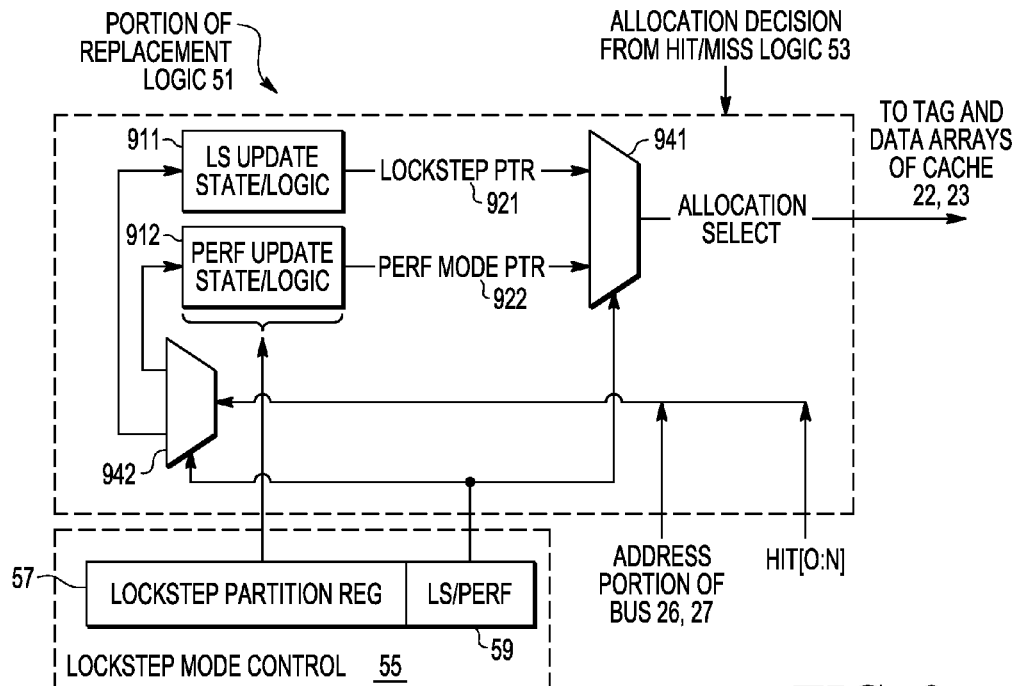
FIG. 9 illustrates, in block diagrammatic form, one example of the replacement logic and lockstep mode control of FIG. 3, wherein lockstep and performance mode versions of replacement pointer instances, state and logic are provided.

FIG. 9 illustrates, in block diagrammatic form, one example of the replacement logic and lockstep mode control of FIG. 3, wherein lockstep and performance mode versions of replacement pointer instances are provided using replicated state and update logic. In particular, the illustrated portion of replacement logic 51 provides lockstep and performance instances (921 and 922) of replacement pointers to select (in correspondence with a current lockstep or performance operating mode LS/PERF) an appropriate cache line into which a new allocation may be filled. Respective instances (911 and 912) of state/update logic maintain state information useful to the selection. For example, in some embodiments, state/update logic instances 911, 912 determine respective operating mode specific replacement pointers (921 and 922) based on parameterizations of a relevant hit/miss history and consistent with an implemented replacement algorithm.

More specifically, lockstep mode replacement pointer 921 is supplied (during lockstep mode operation) to select an entry (e.g., a cache line represented in one of the lockstep ways 81 of cache 22, 23, recall FIG. 3) as an allocation target for a cache fill after lockstep mode miss. Likewise, a performance mode replacement pointer 922 is supplied (during performance mode operation) to select an entry (e.g., a cache line represented in one of the performance ways 82 of cache 22, 23, recall FIG. 3) as an allocation target for a cache fill after performance mode miss. Lockstep and performance mode instances 911 and 912 of state and update logic provide an appropriate allocation target based on the replacement state associated with a current operating mode (e.g., based on lockstep mode replacement pointer 921 or performance mode replacement pointer 922), wherein appropriate subsets of hit/miss traffic are supplied to the respective state and update logic instances 911 and 912 so as to advance replacement states in accord with an implemented replacement algorithm or strategy.

In the example of FIG. 3, LS/PERF field 59 of lockstep mode control 55 controls selection of the appropriate pointer instance (see multiplexer 941) and, together with contents of lockstep partition register 57, informs the application of hit/miss traffic (represented by hit[0:N] and corresponding address indications from bus 26, 27) to the respective instances of state and update logic. Demultiplexer 942 steers hit/miss traffic to the appropriate state and update logic instance, while contents of lockstep partition register 57 encode a current partition of the cache into performance and lockstep ways. Although current operating mode hit/miss traffic typically informs update of the corresponding state and update logic (i.e., performance mode hit/miss traffic updates performance mode state and update logic 912, while lockstep mode hit/miss traffic updates lockstep mode state and update logic 911), as will be explained in greater detail relative to functional flows of FIGS. 11 and 12, lockstep mode hits in performance ways may update performance state and update logic 912 in correspondence with invalidations.

Figure 10:
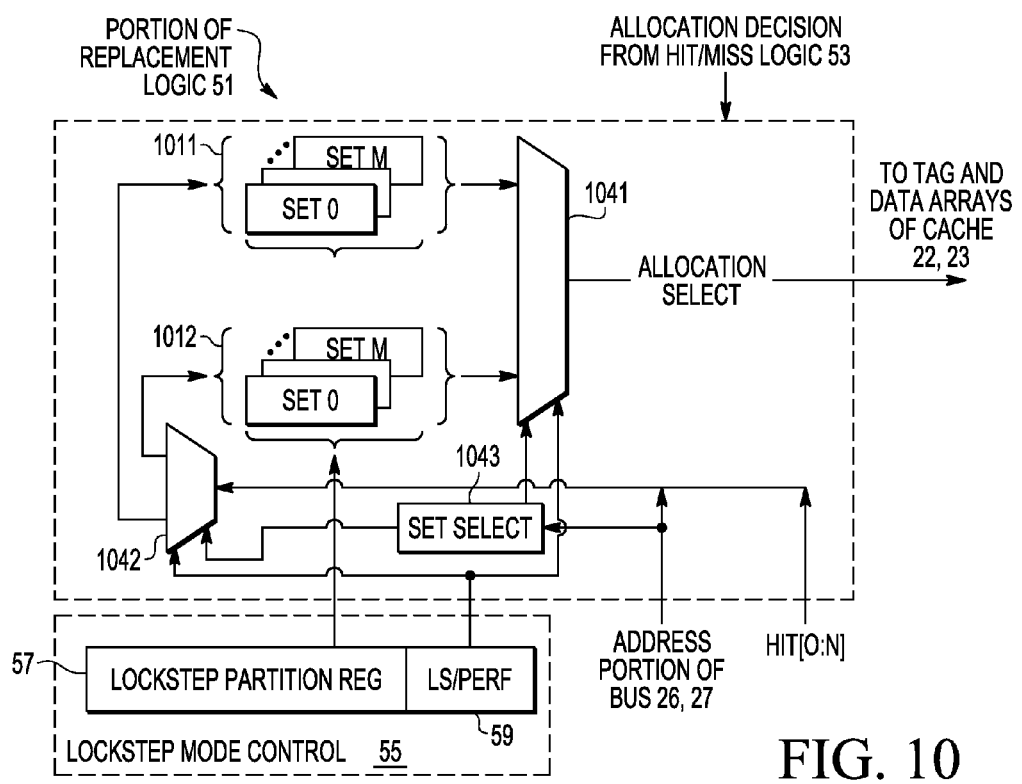
FIG. 10 illustrates, in block diagrammatic form, another example of replacement logic and lockstep mode control of FIG. 3, wherein lockstep and performance mode versions of set-denominated replacement pointer instances, state and logic are provided.

As previously described, hit/miss logic 53 (recall FIG. 3 and the functional flows illustrated by way of FIGS. 7 and 8) determines whether a hit from particular cache partition may be used to satisfy an access request and triggers invalidations and/or new allocations. Thus, allocation decisions from hit/miss logic 53 are shown as a triggering input to the illustrated portion of replacement logic 51. As will be appreciated, replacement logic 51 and hit/miss logic 53 may be integrated in some implementations and any separation of the two in the present description is primarily for purposes of descriptive simplicity. It will be further understood that, in some implementations replacement logic 51 may be decomposed on a cache way basis such that the illustrated portion thereof may be at least partially replicated for respective cache ways. The simplified illustration of FIG. 9 does not attempt illustrate cache way decompositions of replacement logic; however, FIG. 10 illustrates a cache set decomposition. Finally, although replacement strategies may (in some implementations) include global and local aspects, for generality, the simplified illustration of FIG. 9 does not attempt to functionally decompose logic into global and/or local replacement state portions. Rather, persons of ordinary skill in the art will appreciate possible functional decompositions based on description elsewhere herein and based on the description and flows of FIGS. 11 and 12.

As will be appreciated, lockstep mode state and update logic 911 advances lockstep mode replacement pointer 921 in accord with lockstep mode hit/miss traffic and in accord with an implemented FIFO, round-robin, random, LRU, pseudo LRU, or other replacement algorithm/strategy. Likewise, performance mode state and update logic 912 advances performance mode replacement pointer 922 in accord with performance mode hit/miss traffic and in accord with an implemented first-in, first-out (FIFO), round-robin, random, least recently used (LRU), pseudo LRU, or other replacement algorithm/strategy. In an effort to avoid obscuring the invented techniques, state and update logic instances are illustrated as functional blocks and without particularized implementation detail that might be associated with a particular replacement algorithm or strategy. Nonetheless, persons of ordinary skill in the art will appreciate a variety of suitable logic or circuit implementations of state and update logic for any given replacement algorithm or strategy.

FIG. 10 illustrates, in block diagrammatic form, another example of replacement logic and lockstep mode control of FIG. 3, wherein lockstep and performance mode versions of set-denominated replacement instances of state, update logic and replacement pointers are provided. Structures and operation of FIG. 10 will be understood as analogous to those previously explained relative to FIG. 9 but with selection of the appropriate pointer instance (see multiplexer 1041) and steering hit/miss traffic (see multiplexer 1042) in accord with address-based set selections 1043.

Figure 11:
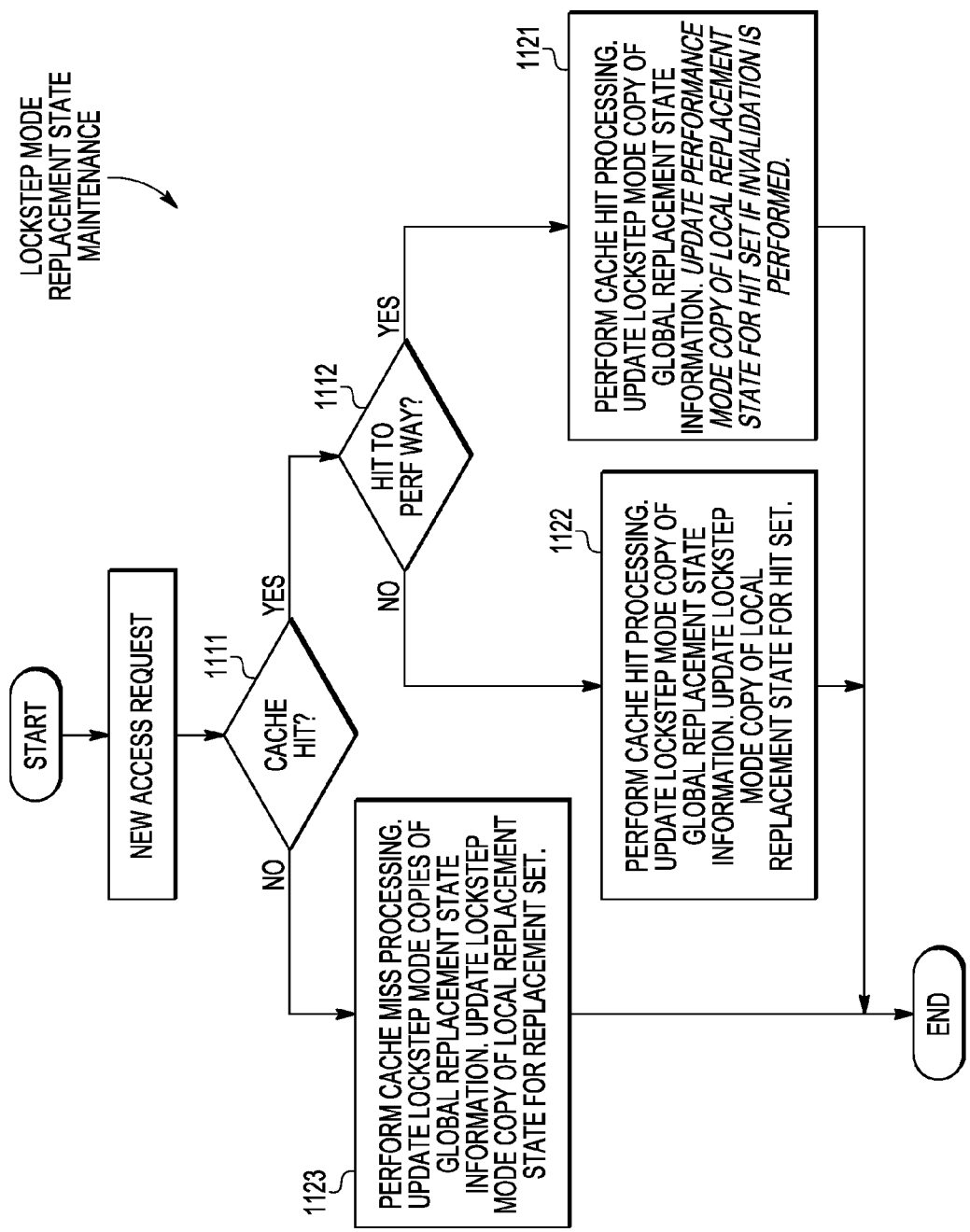
FIG. 11 illustrates, in flow diagram form, lockstep mode handling of updates to global and local replacement states by replacement logic such as illustrated in FIG. 9 or FIG. 10.
Figure 12:
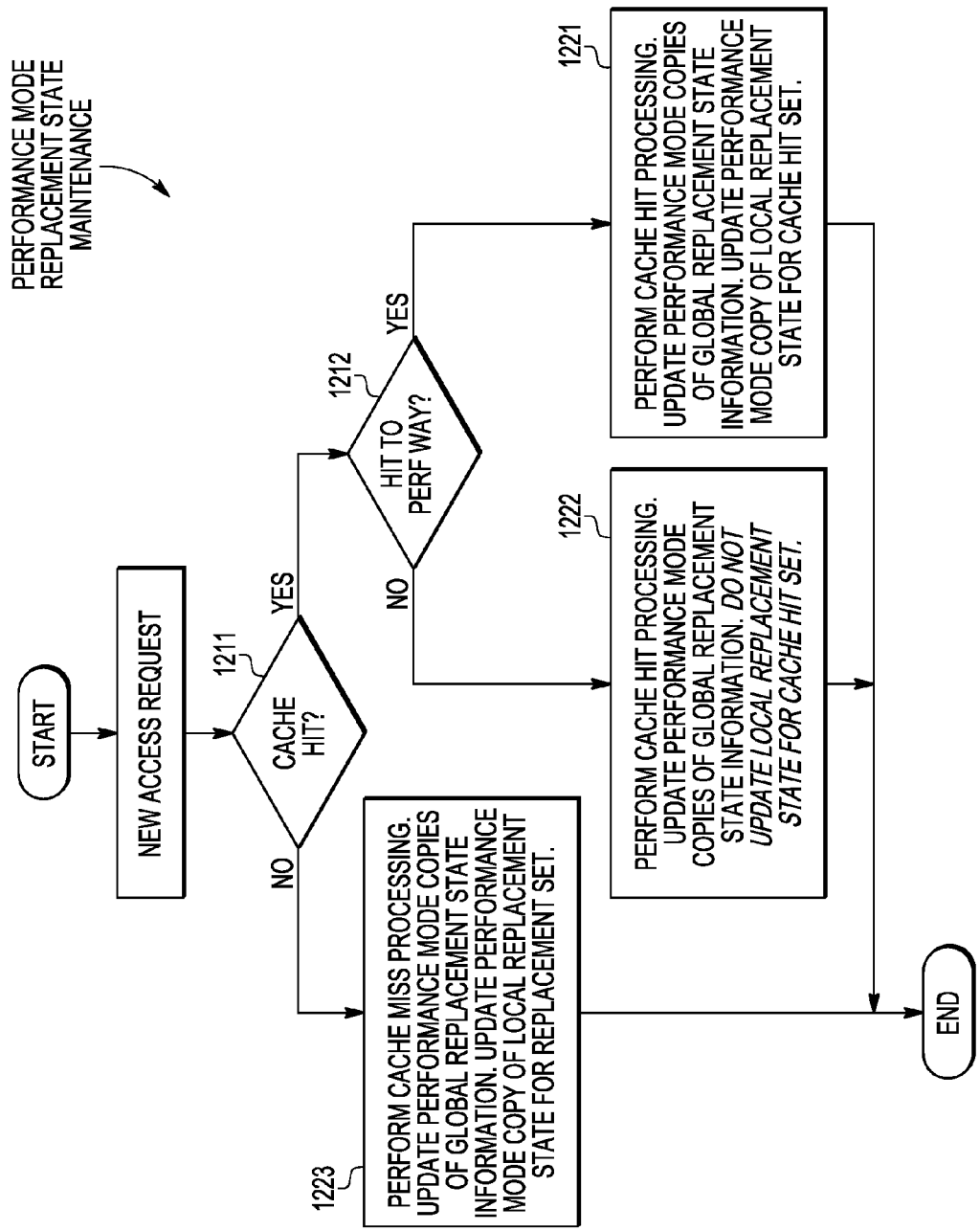
FIG. 12 illustrates, in flow diagram form, performance mode handling of updates to global and local replacement states by replacement logic such as illustrated in FIG. 9 or FIG. 10.

FIG. 11 illustrates lockstep mode maintenance of replacement states by replacement logic such as illustrated in FIG. 9 or FIG. 10. In contrast, FIG. 12 illustrates performance mode maintenance of such replacement states. In both cases, functional flows are explained relative to addressable storage access requests (e.g., read requests and write requests) initiated by a processor 20, 21 (recall FIGS. 1 and 2) and handled by an associated cache (e.g., cache 22 or 23). For simplicity of description and in an effort to focus on replacement state maintenance, cache hit and cache miss processing is not detailed in FIGS. 11 and 12. Rather, cache hit/miss handling during lockstep mode will understood based on the preceding description of FIGS. 7 and 8.

Turing first to FIG. 11, a lockstep mode flow for maintaining replacement states in replacement logic 51 of cache 22, 23 (recall FIG. 3) differentiates primarily between those accesses that hit in a cache way associated with a lockstep partition (e.g., in lockstep ways 81, recall FIG. 3) and those accesses that hit in a cache way associated with a performance partition (e.g., in performance ways 82). For example, the lockstep mode copy of "local replacement state" for the hit set (or simply "replacement state" in embodiments in which no global versus local distinction applies) is updated (1122) for each hit to a lockstep way (see decisions 1111, 1112 [yes, no]). In contrast, for a lockstep mode hit to a performance way (see decisions 1111, 1112 [yes, yes]), the performance mode copy of local replacement state for the hit set (or again simply "replacement state" in embodiments in which no global versus local distinction applies) is updated (1121) only if handling of a lockstep mode hit to a performance way triggers invalidation of the performance way cache line (recall actions 722, 725 in FIG. 7). Such updates to the performance mode replacement state may indicate that the invalidated way is "least recently used" or in some other manner is a better candidate for replacement in an embodiment. Replacement state updates for a cache miss (see decision 1111 [no]) include update (1123) of the lockstep mode copy of "local replacement state" for the replacement set.

Although (i) replication of replacement logic and/or initialization at mode transitions and (ii) decision-making relative to current operating mode (e.g., lockstep mode or performance mode) and partition in which a given access request hits are unconventional, the nature of replacement state updates performed in furtherance of a particular replacement algorithm or strategy (e.g., FIFO, round-robin, random, LRU, pseudo-LRU, etc.) need not be. Rather, any of a variety of state, logic and/or circuit formulations of a desired replacement algorithm or strategy may be employed. Note that in embodiments that maintain global aspects of replacement state, global replacement state is updated in correspondence with cache hits/misses without regard to current operating mode or, in the case of cache hits, the particular cache partition (e.g., lockstep or performance way) in which an access hits. Note also, that in the example of FIG. 7, no distinction between read-type (load) or write-type (store) accesses is necessary.

Turning finally to FIG. 12, a performance mode flow for maintaining replacement states again differentiates primarily between those accesses that hit in a cache way associated with a lockstep partition (e.g., in lockstep ways 81, recall FIG. 3) and those accesses that hit in a cache way associated with a performance partition (e.g., in performance ways 82). For example, the performance mode copy of "local replacement state" for the hit set (or simply "replacement state" in embodiments in which no global versus local distinction applies) is updated (1221) for each hit to a performance way (see decisions 1211, 1212 [yes, yes]). In contrast, for a performance mode hit to a lockstep way (see decisions 1211, 1212 [yes, no]), the lockstep mode copy of local replacement state for the hit set (or again simply "replacement state" in embodiments in which no global versus local distinction applies) is not updated (1222). Rather, the lockstep mode copy of local replacement state (or "replacement state") remains frozen in the state that it had upon transition from lockstep mode to performance mode. By maintaining the current state of lockstep replacement state even when an access hit has occurred (in performance mode), a subsequent transition back to lockstep mode ensures that the replacement of a cache line in one processor will utilize the same replacement value as that in a different processor in which no performance mode cache hit occurred to the line. Replacement state updates for a cache miss (see decision 1211 [no]) include update (1223) of the performance mode copy of "local replacement state" for the replacement set.

As before, in contrast with (i) replication of replacement logic and/or initialization at mode transitions and (ii) decision-making relative to the current operating mode (e.g., lockstep mode or performance mode) and partition in which a given access request hits, the nature or mechanism of replacement state updates performed in furtherance of a particular replacement algorithm or strategy (e.g., FIFO, round-robin, random, LRU, pseudo-LRU, etc.) may be largely conventional. Indeed, any of a variety of state, logic and/or circuit formulations of a desired replacement algorithm or strategy may be employed. Also as before, in embodiments that maintain global aspects of replacement state, global replacement state is updated in correspondence with cache hits/misses without regard to current operating mode or, in the case of cache hits, the particular cache partition (e.g., lockstep or performance way) in which an access hits. Finally, as with lockstep mode maintenance of replacement states, no distinction between read-type (load) or write-type (store) accesses is necessary.

OTHER EMBODIMENTS

Although the invention is described herein with reference to specific embodiments, various modifications and changes can be made without departing from the scope of the present invention as set forth in the claims below. For example, while techniques have been described in the context of particular processor and set associative cache architectures and with safety/redundancy- and performance-oriented use cases for lockstep and non-lockstep modes, the described techniques have broad applicability to designs in which multiple execution units are provided and in which a storage hierarchy seeks to tolerate low overhead dynamic transitions to and from a execution mode in which data is replicated.

Embodiments of the present invention may be implemented using any of a variety of different information processing systems. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits and/or code (e.g., software, firmware and/or microcode) known to those skilled in the art and functionally described herein. Accordingly, component, circuit and/or code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method comprising:
    operating a computational system that includes a plurality of processors each having an associated cache way- or set-partitioned into lockstep and non-lockstep partitions;
    dynamically transitioning between a lockstep mode of operation and a non-lockstep mode of operation, wherein in the lockstep mode of operation, the plural processors each execute a same code sequence in temporal correspondence, and wherein in the non-lockstep mode of operation, the plural processors are capable of executing differing code sequences;
    in the non-lockstep mode, satisfying at least some load hits from the lockstep partition and at least some other load hits from the non-lockstep partition; and
    in the lockstep mode, satisfying load hits only from the lockstep partition.

2. The method of claim 1, further comprising:
    during operation of the computational system, partitioning the associated caches into lockstep and non-lockstep partitions.

3. The method of claim 1, further comprising:
    for a lockstep mode hit in the non-lockstep partition, invalidating the hit entry in the non-lockstep partition.

4. The method of claim 3,
    wherein for a lockstep mode load hit in the non-lockstep partition, the invalidating is contemporaneous with access request and triggers allocation and fill of a corresponding entry in the lockstep partition.

5. The method of claim 3,
    wherein for a lockstep mode store hit in the non-lockstep partition, the invalidating is contemporaneous with access request and triggers allocation and fill of a corresponding entry in the lockstep partition.

6. The method of claim 3, further comprising:
    for a non-lockstep mode store hit in the lockstep partition, invalidating the hit entry in the lockstep partition.

7. The method of claim 6,
    wherein for non-lockstep mode store hits in the lockstep partition, the invalidating is performed in accord with a programmable selection of invalidation behavior.

8. The method of claim 6,
    wherein for a non-lockstep mode store hit in the lockstep partition, the invalidating is contemporaneous with access request and triggers a snoop invalidation of a corresponding entry in another cache.

9. The method of claim 6,
    wherein for a non-lockstep mode store hit in the lockstep partition, the store completes in the lockstep partition but is subsequently invalidated contemporaneous with transition from the non-lockstep mode to the lockstep mode.

10. The method of claim 1,
    in the non-lockstep mode, freezing allocations to the lockstep partition; and
    in the lockstep mode, freezing allocations to the non-lockstep partition.

11. The method of claim 1, wherein the partitioning is by cache ways, and further comprising:
    reserving a programmable number of the cache ways as the lockstep partition.

12. The method of claim 1,
    wherein the partitioning is by cache sets.

13. The method of claim 1,
    wherein, in the lockstep mode of operation, the temporal correspondence provides execution, on each of the plural processors, of same respective instructions of the same code sequence in execution cycles that are either identical or exhibit a generally fixed phase relationship.

14. An apparatus comprising:
    plural processors dynamically transitionable between lockstep and non-lockstep modes of operation, wherein in the lockstep mode of operation, the plural processors each execute a same code sequence in temporal correspondence, and wherein in the non-lockstep mode of operation, the plural processors are capable of executing differing code sequences; and
    respective caches coupled to, and associated with, respective ones of the plural processors, the respective caches each way- or set-partitioned into a lockstep partition and a non-lockstep partition, the respective caches each including control logic operable to, in the non-lockstep mode, satisfy at least some load hits from the lockstep partition thereof and at least some other load hits from the non-lockstep partition thereof, and to, in the lockstep mode, satisfy load hits only from the lockstep partition but, for a hit in the non-lockstep partition, invalidate the hit entry in the non-lockstep partition.

15. The apparatus of claim 14,
    wherein the control logic is further operable to, in the lockstep mode, freeze allocations to entries of the non-lockstep partition and, in the non-lockstep mode, freeze allocations to entries of the lockstep partition.

16. The apparatus of claim 14, further comprising:
    a control register coupled to the control logic, the control register defining a changeable boundary between the lockstep and non-lockstep partition portions of the caches.

17. The apparatus of claim 14, further comprising:
    a control register coupled to the control logic, the control register defining a selectable invalidation behavior for non-lockstep mode, write hits in the lockstep partition.

18. The apparatus of claim 14,
wherein partition of the respective caches into the lockstep and non-lockstep partitions is by cache ways.

19. The apparatus of claim 18,
wherein partition of the respective caches into the lockstep and non-lockstep partitions is by cache sets.

20. An integrated circuit comprising:
a processor capable of dynamic transitions between lockstep and non-lockstep modes of operation;
a cache associated with the processor and having control logic operable to define a changeable boundary between a lockstep partition and non-lockstep partition of the cache; and
control logic responsive to a current mode indication and operable to, in the lockstep mode, freeze allocations to entries of the non-lockstep partition and, in the non-lockstep mode, freeze allocations to entries of the lockstep partition; and
a control register coupled to the control logic, the control register to define a selectable invalidation behavior for non-lockstep mode, write hits in the lockstep partition.

* * * * *